(12) United States Patent
Kim

(10) Patent No.: US 11,813,998 B1
(45) Date of Patent: Nov. 14, 2023

(54) FOLDABLE PEDAL APPARATUS OF VEHICLE

(71) Applicants: Hyundai Motor Company, Seoul (KR); Kia Corporation, Seoul (KR)

(72) Inventor: Eun Sik Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/075,655

(22) Filed: Dec. 6, 2022

(30) Foreign Application Priority Data

Aug. 9, 2022 (KR) .................. 10-2022-0099406

(51) Int. Cl.
| | | |
|---|---|---|
| *G05G 1/30* | (2008.04) | |
| *B60K 26/02* | (2006.01) | |
| *B60T 7/06* | (2006.01) | |
| *B60T 7/04* | (2006.01) | |
| *B60R 21/09* | (2006.01) | |

(52) U.S. Cl.
CPC .............. *B60R 21/09* (2013.01); *B60K 26/02* (2013.01); *B60T 7/06* (2013.01); *B60K 2026/026* (2013.01)

(58) Field of Classification Search
CPC .. G05G 1/30; G05G 1/32; G05G 1/36; G05G 1/38; G05G 1/40; G05G 1/405; G05G 1/44; G05G 1/445; G05G 5/005; G05G 5/03; G05G 5/05; G05G 5/28; B60K 26/02; B60K 26/021; B60K 2026/026; B60K 2026/023; B60K 2026/022; B60T 7/04; B60T 7/06; B60T 7/065; B60R 21/09
See application file for complete search history.

(56) References Cited

U.S. PATENT DOCUMENTS

| | | | | |
|---|---|---|---|---|
| 5,078,024 A | * | 1/1992 | Cicotte ................. | G05G 1/405 74/513 |
| 6,364,047 B1 | * | 4/2002 | Bortolon ............... | B60K 23/02 74/513 |
| 6,962,094 B2 | * | 11/2005 | Porter .................... | G05G 1/405 74/512 |
| 7,343,830 B2 | * | 3/2008 | Rinero .................. | G05G 1/405 74/512 |
| 8,701,522 B2 | * | 4/2014 | Kim ........................ | G05G 1/30 74/513 |

(Continued)

FOREIGN PATENT DOCUMENTS

| | | | | |
|---|---|---|---|---|
| CN | 207225332 U | * | 4/2018 | |
| KR | 2017137427 A | * | 12/2017 | ............. B60K 26/02 |

(Continued)

OTHER PUBLICATIONS

Machine Translation of KR-2017137427-A.*
Machine Translation of CN-207225332-U.*
Machine Translation of WO-2021182563-A1.*

*Primary Examiner* — Vinh Luong
(74) *Attorney, Agent, or Firm* — MORGAN, LEWIS & BOCKIUS LLP

(57) ABSTRACT

A foldable pedal apparatus for a vehicle, includes a pedal module popped up to be manipulated by a driver in a manual driving mode in which a driver drives manually, wherein the pedal module may be hidden so as not to be manipulated by the driver in a self-driving mode, and the foldable function of pedals may be implemented by moving the pedal module forwards and backwards by the rotation of the rotation module by operation of the motor.

19 Claims, 12 Drawing Sheets

(56) References Cited

U.S. PATENT DOCUMENTS

| | | |
|---|---|---|
| 10,739,809 B2 | 8/2020 | Wojciechowski et al. |
| 10,906,514 B1* | 2/2021 | Kim .................... G05G 5/03 |
| 10,946,741 B1* | 3/2021 | Kim .................... B60T 7/06 |
| 11,021,058 B1* | 6/2021 | Kim .................... G05G 5/28 |
| 11,249,506 B1* | 2/2022 | Kim .................... G05G 5/28 |
| 11,327,520 B1* | 5/2022 | Kim .................... G05G 5/05 |
| 11,458,838 B1* | 10/2022 | Kim .................... B60T 7/06 |
| 11,465,498 B1* | 10/2022 | Kim .................... B60T 7/06 |
| 11,513,550 B1* | 11/2022 | Kim .................... G05G 1/42 |
| 11,613,295 B1* | 3/2023 | Harmon .............. B60N 3/063 |
| | | 280/775 |
| 2007/0137397 A1* | 6/2007 | Choi .................... G05G 1/36 |
| | | 74/512 |
| 2009/0223319 A1* | 9/2009 | Choi .................... G05G 1/36 |
| | | 74/512 |
| 2019/0163227 A1* | 5/2019 | Kadoi .................. G05G 5/05 |
| 2021/0284020 A1* | 9/2021 | Kita ................... G05G 25/04 |
| 2022/0048384 A1* | 2/2022 | Kim .................... G05G 5/28 |
| 2022/0055477 A1* | 2/2022 | Kim .................... G05G 1/44 |
| 2023/0024609 A1* | 1/2023 | Kim .................... G05G 5/28 |

FOREIGN PATENT DOCUMENTS

| | | | |
|---|---|---|---|
| KR | 10-2021-0125733 | 10/2021 | |
| WO | WO-2020180141 A1 * | 9/2020 | ............. B60T 7/042 |
| WO | WO-2021182563 A1 * | 9/2021 | ........... B60K 26/021 |

* cited by examiner

FOLDABLE PEDAL APPARATUS OF VEHICLE

CROSS-REFERENCE TO RELATED APPLICATION(S)

The present application claims priority to Korean Patent Application No. 10-2022-0099406, filed on Aug. 9, 2022, the entire contents of which is incorporated herein for all purposes by this reference.

BACKGROUND OF THE PRESENT DISCLOSURE

Field of the Present Disclosure

The present disclosure relates to a foldable pedal apparatus for a vehicle, and to a technology regarding a foldable pedal apparatus for a vehicle, wherein in a manual driving mode in which a driver drives manually, a pedal module protrudes and is exposed toward the driver to be manipulated by the driver, and in a self-driving mode, the pedal module is hidden and prevented from being exposed toward the driver so as not to be manipulated by the driver.

Description of Related Art

A self-driving vehicle is being rapidly developed as a smart vehicle employing self-driving technology that allows the vehicle to autonomously reach destinations even when a driver does not manually manipulate a steering wheel, an accelerator pedal, a brake, etc.

When a self-driving situation is universally realized, it is possible to select a manual driving mode in which a driver drives manually, and a self-driving mode in which a vehicle autonomously drives to a destination even when the driver does not drive manually.

In the self-driving mode, the driver should be able to rest comfortably with legs outstretched. When pedals (an accelerator pedal and a brake pedal) positioned on the floor of the driver's side of the vehicle are exposed inside, the driver's rest may be disturbed.

Furthermore, the self-driving mode is a mode in which the driver does not manipulate pedals of the vehicle. When the driver manipulates the pedals during self-driving, a vehicle controller may be configured to determine that the driver wants to end the self-driving and drive manually, and may terminate control for the self-driving.

However, because the pedals of the vehicle are provided on the floor of the driver's side to be exposed, the driver may unintentionally manipulate the pedals (erroneous manipulation of the pedals) in the self-driving mode, and thus an accident may occur depending on road conditions or the distance between vehicles.

Therefore, it is necessary to develop technology for a pedal apparatus which allows a pedal pad to protrude and be exposed toward a driver to be manipulated by the driver in a manual driving mode in which the driver drives manually, and blocks the exposure of the pedal pad in a self-driving mode so that the pedal pad cannot be manipulated by the driver for the driver's rest and the driver's safety such as prevention of erroneous manipulation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus for a vehicle, wherein in a manual driving mode in which a driver drives manually, a pedal module protrudes and is exposed (popped up) toward the driver to be manipulated by the driver, and in a self-driving mode, the pedal module is hidden and prevented from being exposed toward the driver so that the pedal module cannot be manipulated by the driver. An aspect of the present disclosure is to enable the driver to have a comfortable rest in the self-driving mode, and furthermore, improve safety by preventing erroneous manipulation of pedals in the self-driving mode.

Another aspect of the foldable pedal apparatus according to an exemplary embodiment of the present disclosure is to minimize the number of components by simplifying the mechanism of a foldable function as much as possible, reducing the cost, reducing the weight, and minimizing the layout of the pedal apparatus.

In accordance with an aspect of the present disclosure, a foldable pedal apparatus for a vehicle may include: a pedal module provided to be movable forwards and backwards through a footrest panel; and a rotation module rotatably coupled to the footrest panel and brought into contact with the pedal module during rotation thereof to move the pedal module forwards and backwards through the footrest panel.

The foldable pedal apparatus may further include: a motor fixed on the footrest panel; and a power transmission device connecting the motor to the rotation module to transmit power of the motor to the rotation module.

When the pedal module is moved forward by rotation of the rotation module and is hidden in the footrest panel, the pedal module may be in a hidden state in which a driver is not capable of manipulating the pedal module in a self-driving mode of the vehicle.

When the pedal module is moved backward by rotation of the rotation module and protrudes from the footrest panel, the pedal module may be in a popped-up state in which the driver is capable of manipulating the pedal module in a manual driving mode of the vehicle.

The pedal module may include: a pedal housing provided to move forwards and backwards through a panel hole formed in the footrest panel; and a pedal pad including a lower end portion rotatably hinged to the pedal housing and an upper end portion rotatable forwards and backwards about a hinge point of the lower end portion.

A guide protrusion may be disposed to extend forwards and backwards on the bottom surface in front of the footrest panel; and a guide groove into which the guide protrusion is inserted may be formed to extend forwards and backwards in the bottom surface of the pedal module.

A folding stopper may be provided at the front end portion of the guide protrusion; and when the pedal module is moved forward and brought into contact with the folding stopper, the position of the pedal module may be fixed in a hidden state.

A pop-up stopper may be disposed to protrude laterally from a side surface of the pedal module; when the pedal module moves backward, the pop-up stopper may be brought into contact with the footrest panel; and when the pop-up stopper is brought into contact with the footrest panel, the position of the pedal module may be fixed in a popped-up state.

The rotation module may include: a rotation cover configured to open or close the panel hole of the footrest panel during rotation; a moving lever connected to the upper end portion of the rotation cover at a predetermined angle and rotating integrally with the rotation cover; and a moving lever pin provided in the moving lever and configured to be brought into contact with the pedal module during rotation of the moving lever to move the pedal module.

A slot guide, which vertically extends and is open upward, may be formed at the front upper portion of the pedal module; and when the rotation module rotates, the moving lever pin may be inserted into the slot guide to be brought into contact with the pedal module.

When the rotation cover closes the panel hole, the pedal module may move forward to maintain a hidden state in which the pedal module is hidden in the footrest panel.

The rotation cover and the moving lever may be formed with an obtuse angle of 90 degrees or larger than the 90 degrees; and when the rotation cover closes the panel hole, the moving lever may be positioned in front of the footrest panel, and the moving lever pin may be separated from the slot guide.

The moving lever pin separated from the slot guide may be positioned above the slot guide; when the rotation cover closing the panel hole rotates in a direction in which the panel hole is opened, the moving lever pin may be inserted into the slot guide by the downward rotation of the moving lever to be brought into contact with the pedal module; and when the rotation cover rotates for an opening operation, the moving lever pin may apply force to the pedal module so that the pedal module is moved backward and popped upwards.

When the popping-up of the pedal module is completed, the rotation cover may be brought into contact with the footrest panel above the panel hole and fixedly positioned, and the moving lever pin may remain inserted into the slot guide to fix the position of the popped-up pedal module.

A support force of the moving lever and the moving lever pin inserted into the slot guide may prevent the pedal module from being pushed forward when the driver manipulates the pedal module while the pedal module is popped up.

The slot guide may be formed to have a gap increasing toward an upper end portion thereof which is open for insertion and separation of the moving lever pin when the moving lever rotates.

The motor may be a bidirectional rotation motor configured for rotating both in a clockwise direction and in a counterclockwise direction, and at least two motors may be disposed.

The power transmission device may include: a motor gear coupled to the motor; a rotation gear rotating in mesh with the motor gear; and a rotation pin, which extends through the center portion of the rotation gear and the rotation module to be integrated with the rotation gear and the rotation module and is rotatably provided on the footrest panel.

The motor may be operable by manipulating a switch provided in the vehicle; the switch may include a dial switch or a slide switch; and the popped-up position of the pedal module may be adjusted to a target position by controlling driving of the motor in response to rotation of the dial switch or sliding the slide switch.

Two pedal modules including an identical configuration may be provided left and right while being spaced from the footrest panel, one of the two pedal modules may be used as a brake pedal, and the other may be used as an accelerator pedal.

The foldable pedal apparatus according to an exemplary embodiment of the present disclosure is configured such that, in a manual driving mode in which a driver drives manually, a pedal module may protrude and be exposed (popped up) toward the driver to be manipulated by the driver, and in a self-driving mode, the pedal module may be hidden and prevented from being exposed toward the driver so as not to be manipulated by the driver. Therefore, the foldable pedal apparatus enables the driver to have a comfortable rest in the self-driving mode, and furthermore, may improve safety by preventing erroneous manipulation of pedals in the self-driving mode.

Furthermore, the foldable pedal apparatus according to an exemplary embodiment of the present disclosure is configured to implement the foldable function of pedals by moving the pedal module forwards and backward by the rotation of a power transmission device and a rotation module by operation of a motor. Therefore, the number of components may be minimized by simplifying the mechanism of a foldable function as much as possible, reducing the cost, reducing the weight, and minimizing the layout.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
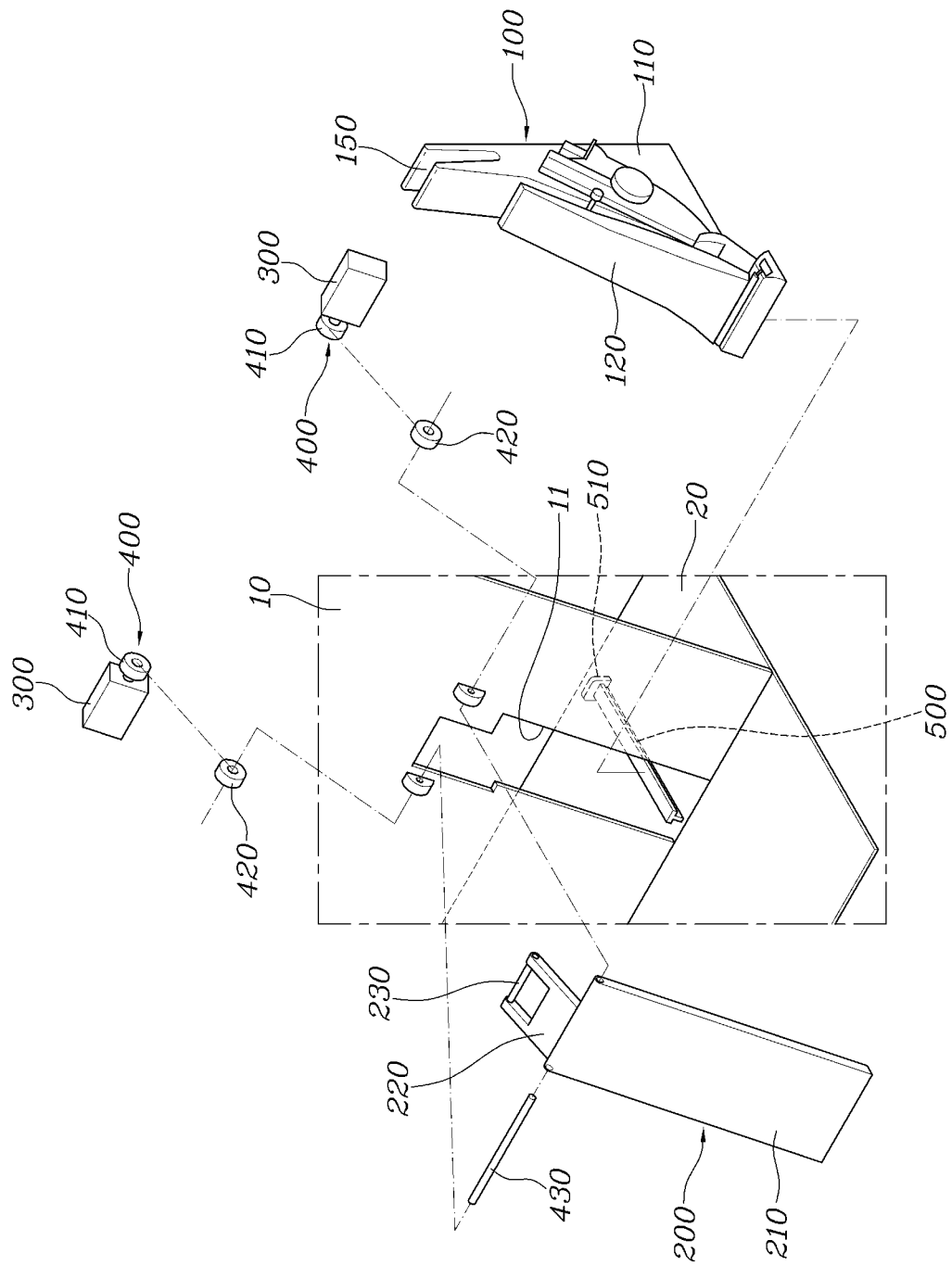
FIG. 1 is an exploded view of a foldable pedal apparatus according to an exemplary embodiment of the present disclosure.
Figure 2:
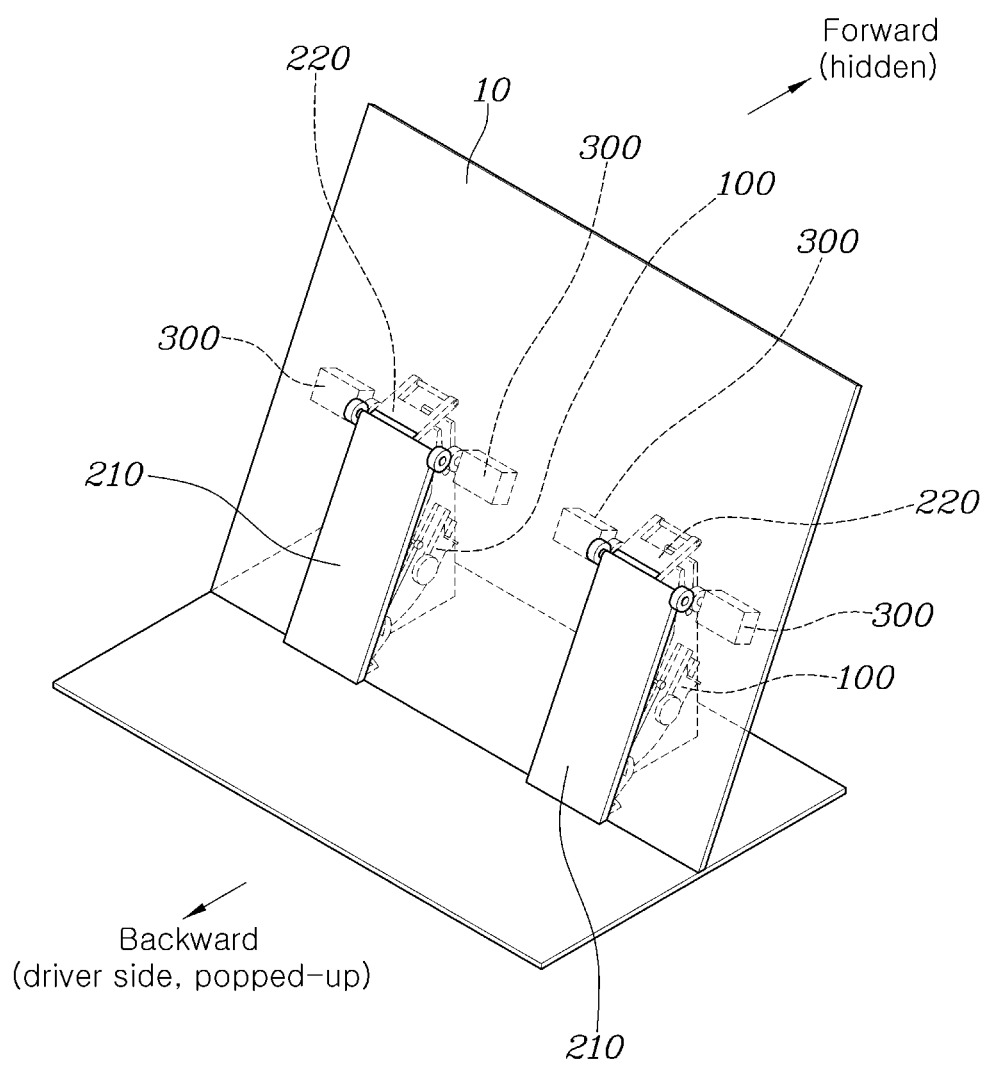
FIG. 2 illustrates the combined state of the pedal apparatus in FIG. 1 and illustrates a state in which a pedal module is hidden.
Figure 3:
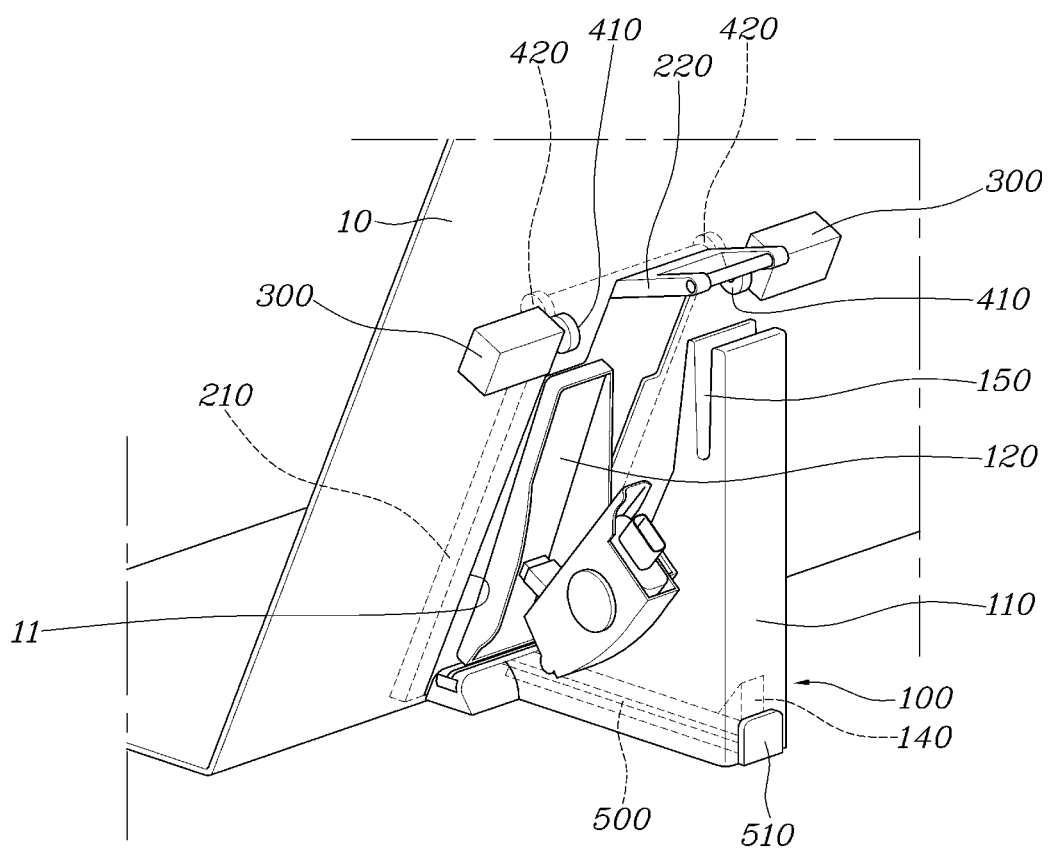
FIG. 3 illustrates the foldable pedal apparatus in FIG. 2, viewed from the front.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar elements are provided the same and similar reference numerals, so duplicate descriptions thereof will be omitted.

The terms "module" and "unit" used for the elements in the following description are provided or interchangeably used in consideration of only the ease of writing the specification, and do not have distinct meanings or roles by themselves.

In describing the exemplary embodiments included in the present specification, when the detailed description of the relevant known technology is determined to unnecessarily obscure the gist of the present disclosure, the detailed description may be omitted.

Furthermore, the accompanying drawings are provided only for easy understanding of the exemplary embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element.

In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation system, a logic command, or input/output information, and at least one processor configured to perform determination, calculation, decision or the like which are required for responsible function controlling.

Hereinafter, a foldable pedal apparatus for a vehicle according to an exemplary embodiment of the present disclosure will be described with reference to the accompanying drawings.

As shown in FIGS. 1 to 11, a foldable pedal apparatus for a vehicle according to an exemplary embodiment of the present disclosure includes: a pedal module 100 provided to be movable forwards and backwards through the footrest panel 10; a rotation module 200 rotatably coupled to the footrest panel 10 and brought into contact with the pedal module 100 during rotation to move the pedal module 100 forwards and backward directions; a motor 300 fixed on the footrest panel 10; and a power transmission device 400 configured to connect the motor 300 to the rotation module 200 to transmit power of the motor 300 to the rotation module 200.

A panel hole 11 is formed in the forward/backward direction through the footrest panel 10, the pedal module 100 is provided to be movable forwards and backwards in a state of being in close contact with the bottom surface of the footrest panel 10, and the pedal module 100 moves through the panel hole 11 when moving forwards and backwards thereof.

When the rotation module 200 is rotated by operation of the motor 300 and when the rotation force of the rotation module 200 is transmitted to the pedal module 100 and thus the pedal module 100 moves forward through the panel hole 11, the pedal module 100 is hidden in the footrest panel 10. At the instant time, the pedal module 100 is in a hidden state in which the pedal module 100 is prevented from being exposed toward a driver and cannot be manipulated by the driver (see FIG. 2, FIG. 3 and FIG. 4).

When the rotation module 200 is rotated by operation of the motor 300 and when the rotation force of the rotation module 200 is transmitted to the pedal module 100 and thus the pedal module 100 moves backward through the panel hole 11, the pedal module 100 protrudes from the footrest panel 10 and protrudes into the vehicle. At the instant time, the pedal module 100 is exposed toward the driver to be in a popped-up state in which the pedal module 100 may be manipulated by the driver (see FIGS. 9 to 11).

The pedal module 100 according to an exemplary embodiment of the present disclosure includes: a pedal housing 110 provided to move forwards and backwards through the panel hole 11 formed in the footrest panel 10; and a pedal pad 120, which has a lower end portion rotatably hinged to the pedal housing 110 and an upper end portion rotatable forwards and backwards about a hinge point of the lower end portion.

The pedal housing 110 is provided to be accommodated on the bottom surface of the footrest panel 10, is provided to be movable forwards and backwards thereof, and passes through the panel hole 11 of the footrest panel 10 when moving forwards and backwards thereof.

The pedal module 100 according to an exemplary embodiment of the present disclosure is an organ type in which the rotation center portion of the pedal pad 120 is at the lower side and thus the driver manipulates the pedal module 100 by rotating the upper portion of the pedal pad 120 forward thereof. The organ pedal apparatus is advantageous in that the area of the pedal pad on which the driver steps is large and the movement of the pedal pad is similar to the trajectory of the driver's foot so that the feeling of manipulation may be improved, and thus the driver can manipulate the pedal apparatus comfortably.

A guide protrusion and a guide groove are provided to guide the forwards and backwards movement of the pedal module 100.

That is, a guide projection 500 is provided to extend forwards and backwards on a front bottom surface 20 with reference to the footrest panel 10, and a guide groove 130, into which the guide projection 500 is inserted, is formed to extend forwards and backwards in the bottom surface of the pedal module 100.

The guide protrusion 500 is fixedly provided at a front position of the panel hole 11, and the guide groove 130 is formed in the bottom surface of the pedal housing 110 to extend in a direction identical to the extension direction of the guide protrusion 500.

The guide protrusion 500 is provided to be inserted into the guide groove 130, and the pedal module 100 moves forwards and backwards along the guide protrusion 500.

Each of the guide groove 130 and the guide protrusion 500 may have a l'-shaped cross section to prevent the pedal module 100 from being separated upwards.

In accordance with the present disclosure, a folding stopper 510 is provided at the front end portion of the guide protrusion 500.

The folding stopper 510 may be formed integrally with the front end portion of the guide protrusion 500, or may separately manufactured and then fixedly coupled thereto.

The folding stopper 510 provided at the front end portion of the guide protrusion 500 is formed to have a size in which the folding stopper 510 protrudes outwardly from the guide protrusion 500.

Therefore, when the pedal module 100 moves forward along the guide protrusion 500, the lower end portion of the front surface of the pedal housing 110 comes into contact with the folding stopper 510, and thus the forward movement of the pedal module 100 is ended. Furthermore, the pedal module 100 is positioned in front of the footrest panel 10 and hidden in the footrest panel 10, and the position in the hidden state is fixed.

A pop-up stopper 140 is formed to protrude laterally from a side surface of the pedal module 100.

The pop-up stopper 140 may be integrally formed to protrude laterally from one side surface of the pedal housing 110, or may be separately manufactured and then fixedly coupled thereto.

The pop-up stopper 140 is formed to be positioned behind the midpoint of the length of the lower end portion of the pedal housing 110 in the forward/backward direction thereof.

Therefore, when the pedal module 100 moves backward along the guide protrusion 500, the pop-up stopper 140 comes into contact with the front surface of the footrest panel 10, and thus the backward movement of the pedal module 100 is ended. Furthermore, the pedal module 100 protrudes from the footrest panel 10 and is exposed toward the driver, and thus the position in the popped-up state where the driver can manipulate the pedal module 100 is fixed.

The rotation module 200 may be provided to receive power from the motor 300 through the power transmission device 400 and rotate about the footrest panel 10.

The rotation module 200 includes: a rotation cover 210 configured to open or close the panel hole 11 of the footrest panel 10 during rotation; a moving lever 220 connected to the upper end portion of the rotation cover 210 at a predetermined angle and rotating integrally with the rotation cover 210; and a moving lever pin 230 provided in the moving lever 220 and configured to be brought into contact with the pedal module 100 during the rotation of the moving lever 220 to move the pedal module 100.

The rotation cover 210 is formed to have a size to cover the panel hole 11, the moving lever 220 is integrally connected to the upper end portion of the rotation cover 210, and the moving lever pin 230 is coupled to the end portions of the moving lever 220 while extending leftward and rightward.

Connection portions of the rotation cover 210 and the moving lever 220 are coupled to a rotation pin that will be described later, and both end portions of the rotation pin are rotatably coupled to the footrest panel 10, whereby the rotation module 200 may open or close the panel hole 11 while rotating about the footrest panel 10 by use of the power from the motor 300.

When the rotation cover 210 closes the panel hole 11, the pedal module 100 moves forward along the guide protrusion 500 and maintains a hidden state in which the pedal module 100 is hidden in the footrest panel 10.

When the rotation cover 210 closes the panel hole 11, the rotation cover 210 is in a constrained state in which the rotation cover 210 cannot rotate due to locking of the motor 300, and thus the pedal module 100 in the hidden state, which is hidden in the footrest panel 10, is blocked by the rotation cover 210 and cannot move backward, maintaining the hidden state.

A slot guide 150, which vertically extends and is open upward, is formed at the front upper portion of the pedal module 100. When the rotation module 200 rotates, the moving lever pin 230 is inserted into the slot guide 150 to be brought into contact with the pedal module 100.

The slot guide 150 is formed at the front upper portion of the pedal housing 110, and vertically extends to be open at the upper side of the pedal housing 110. Furthermore, the slot guide 150 is formed to be open at both sides of the pedal housing 110.

When the moving lever 220 is rotated by the rotation of the rotation module 200, the moving lever pin 230 coupled to the moving lever 220 is inserted into the slot guide 150 to be brought into contact with the pedal module 100, or is separated from the slot guide 150 and maintains the separated state.

The slot guide 150 may be formed so that the open upper end portion has a wider gap cross-section than a lower end portion, and may be formed so that the gap gradually increases from the lower end portion toward the open upper end portion. Thus, when the moving lever 220 rotates, the moving lever pin 230 may be inserted into or separated from the slot guide 150 or separated from the slot guide 150 in a smoother way.

The rotation cover 210 and the moving lever 220 are formed with an obtuse angle of 90 degrees or larger than the 90 degrees.

Figure 4:
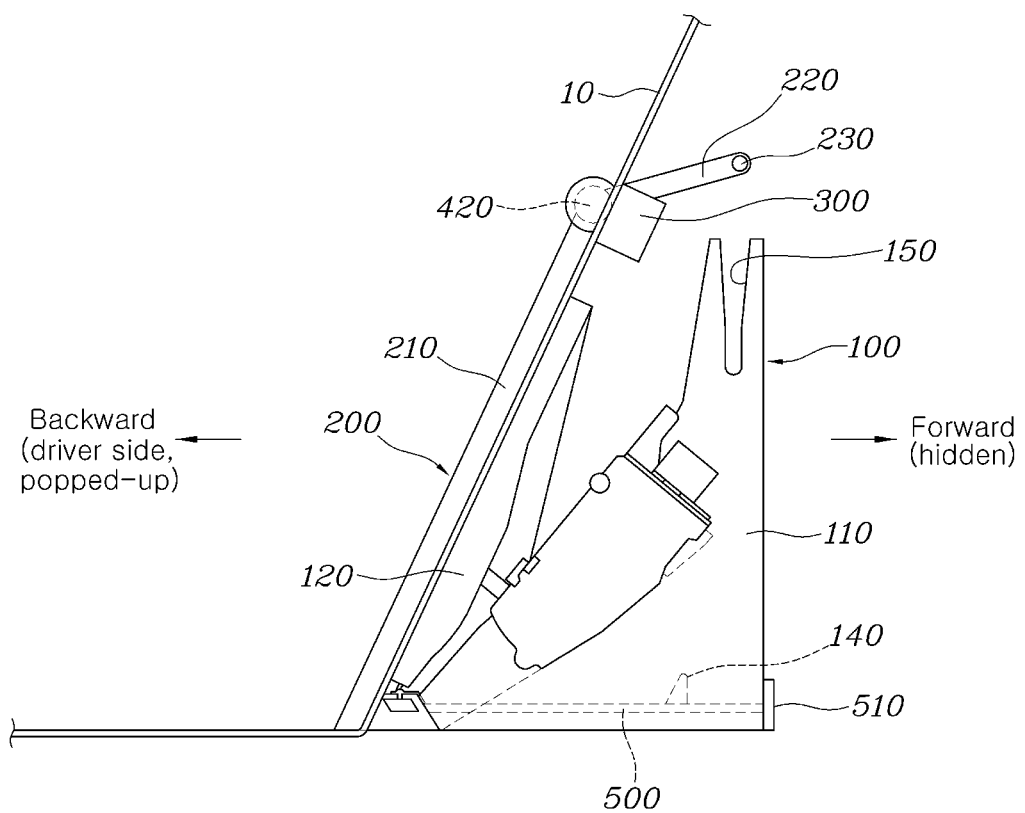
FIG. 4 is a side view of the foldable pedal apparatus in FIG. 2.
Figure 5:
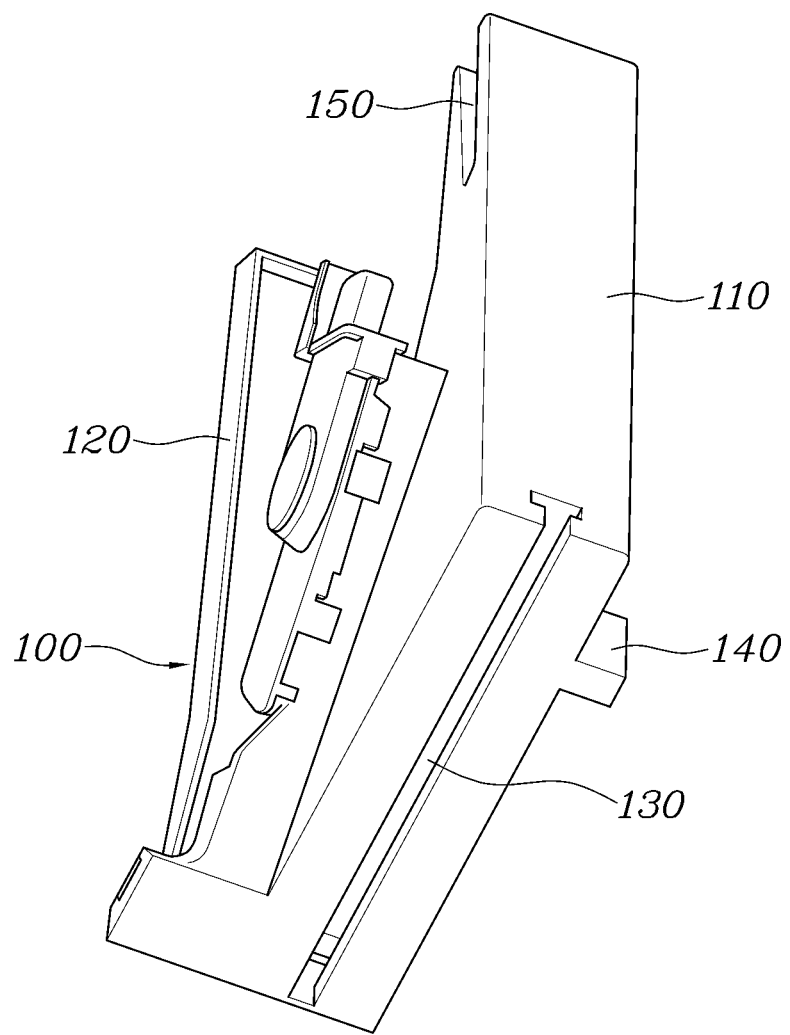
FIG. 5 and FIG. 6 illustrate a pedal module according to an exemplary embodiment of the present disclosure.
Figure 6:
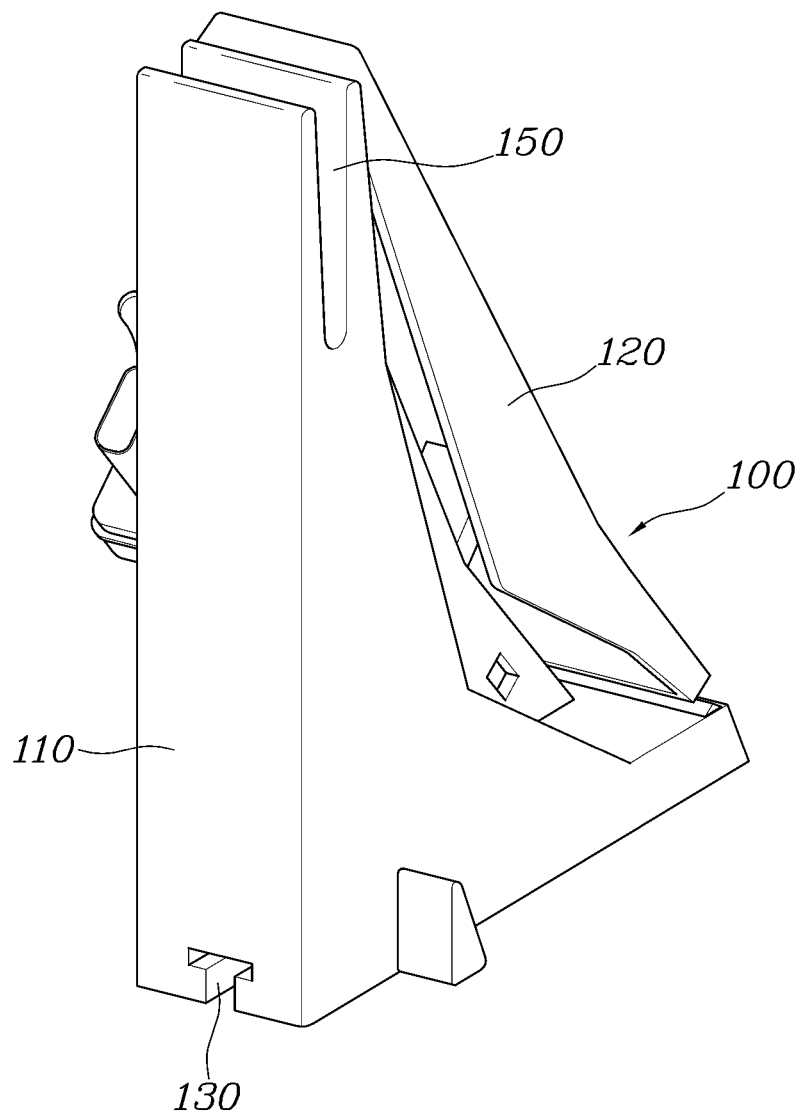
Figure 7:
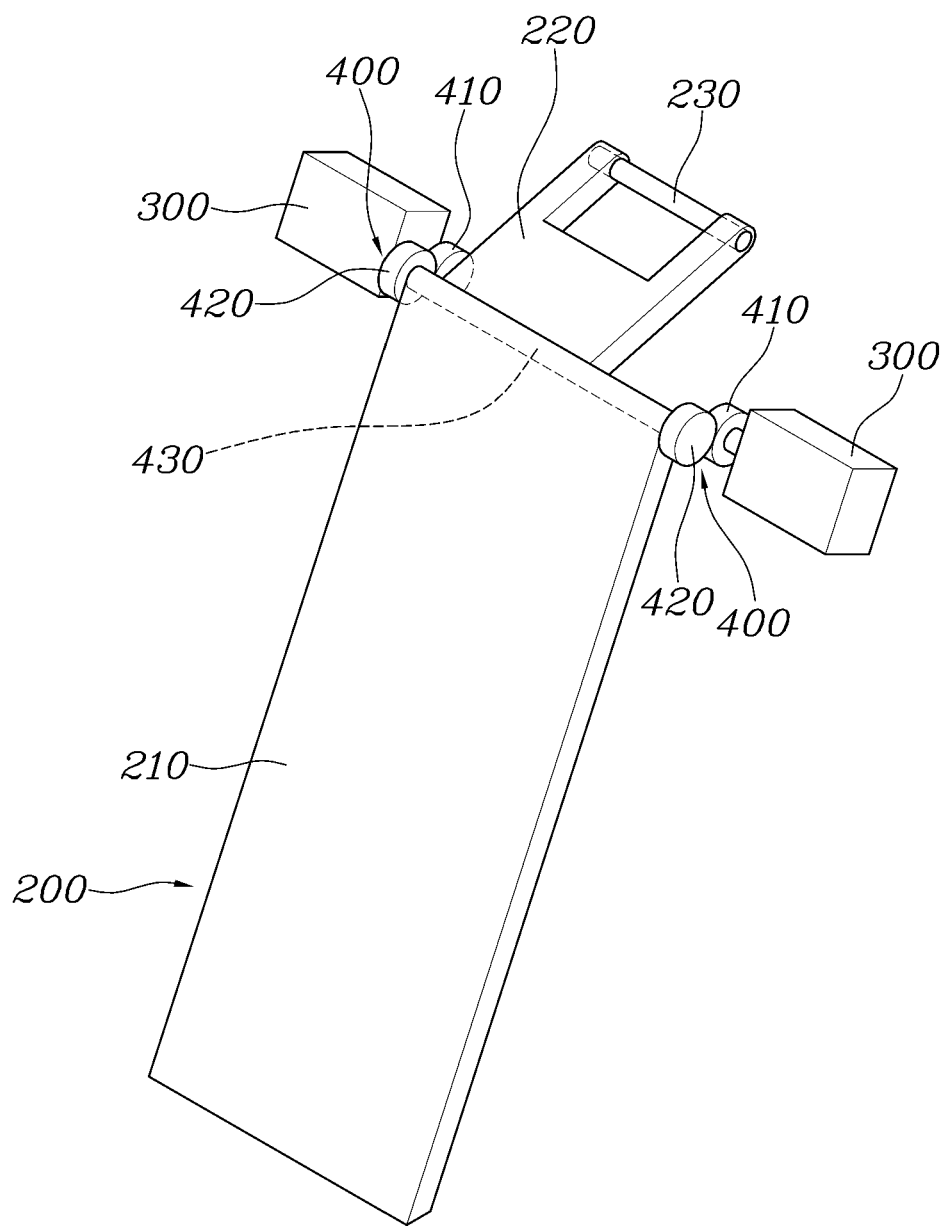
FIG. 7 illustrates a rotation module, a motor, and a power transmission device according to an exemplary embodiment of the present disclosure.

Therefore, as shown in FIG. 4, in a state in which the rotation cover 210 closes the panel hole 11, that is, in the hidden state in which the pedal module 100 is hidden in the footrest panel 10, the moving lever 220 is positioned in front of the footrest panel 10 while the moving lever pin 230 is separated from the slot guide 150.

It is designed that the moving lever pin 230 separated from the slot guide 150 is positioned above the slot guide 150, the moving lever pin 230 moves along the rotation radius of the moving lever 220, and the movement trajectory of the moving lever pin 230 matches the slot guide 150. Therefore, when the moving lever 220 rotates, the moving lever pin 230 may be smoothly inserted into the slot guide 150.

Figure 8:
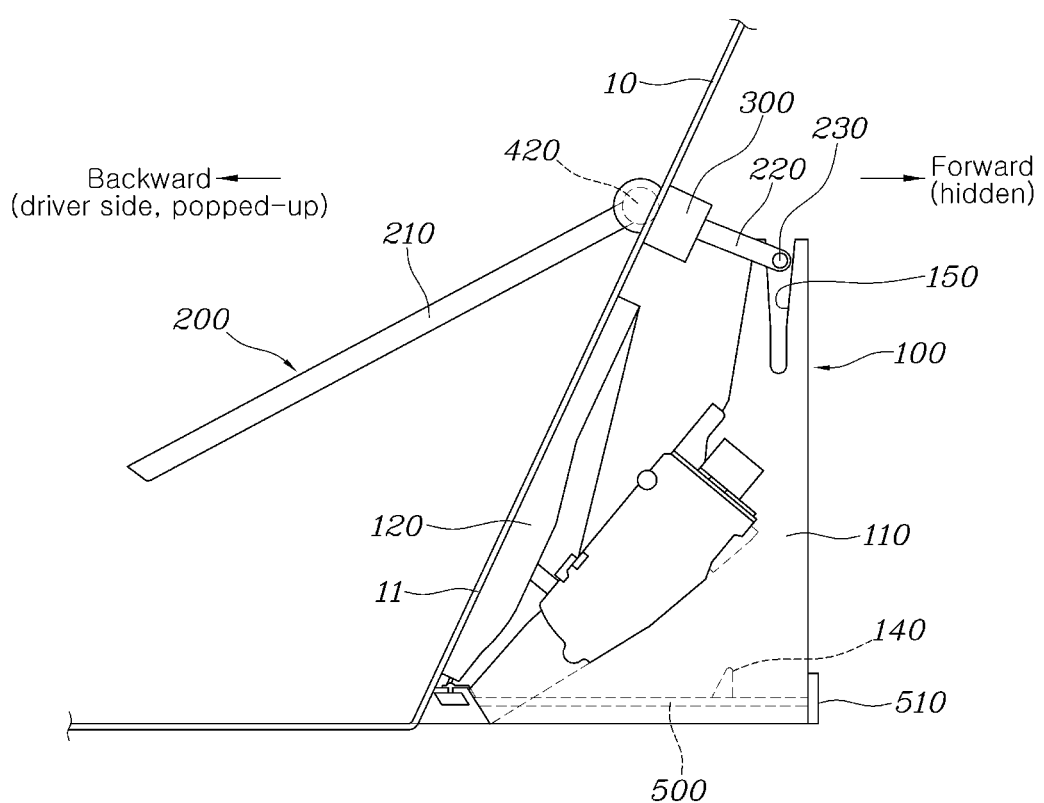
FIG. 8 illustrates a state in which the rotation module is rotated by operation of the motor in FIG. 4.

As shown in FIG. 4, when the rotation cover 210 closing the panel hole 11 receives power from the motor 300 and rotates, the rotation cover 210 rotates in a direction in which the panel hole 11 is opened as shown in FIG. 8. At the instant time, the moving lever pin 230 is inserted into the slot guide 150 by the downward rotation of the moving lever 220 and is brought into contact with the pedal module 100.

In the state of FIG. 8 when the rotation cover 210 continuously rotates using the power of the motor 300 to perform an opening operation, the moving lever pin 230 inserted into the slot guide 150 applies force to the pedal module 100. Therefore, the pedal module 100 moves backward through the panel hole 11 along the guide protrusion 500, and thus switches to a popped-up state in which the pedal module 100 is exposed toward the driver as shown in FIGS. 9 to 11.

When the popping-up of the pedal module 100 is completed, the rotation cover 210 is rotated 180 degrees upwards from the state that sealed the panel hole, and thus the rotation cover 210 is fixedly positioned while being in contact with the footrest panel 10 above the panel hole 11. Furthermore, the moving lever pin 230 remains inserted into the slot guide 150 to fix the position of the pedal module 100.

Figure 9:
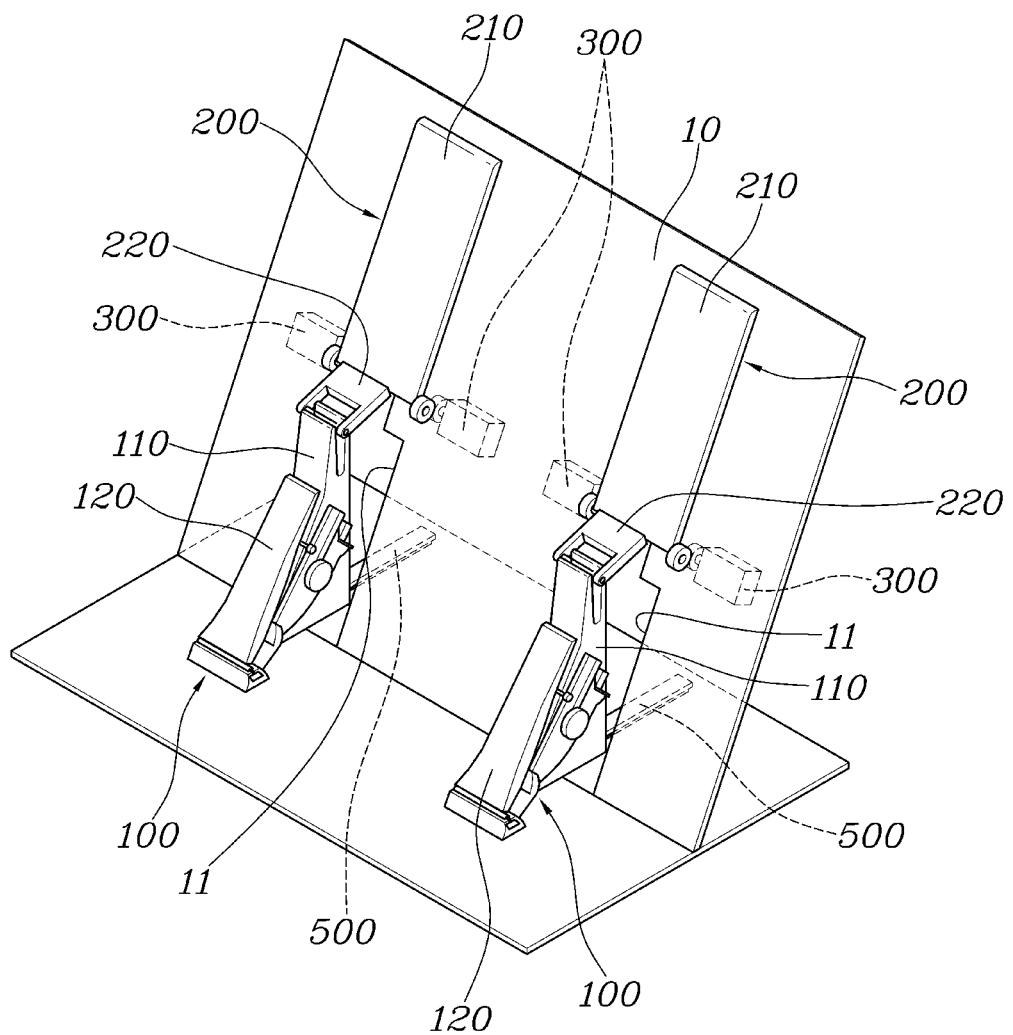
FIG. 9 illustrates a state in which a pedal module is popped up according to an exemplary embodiment of the present disclosure.
Figure 10:
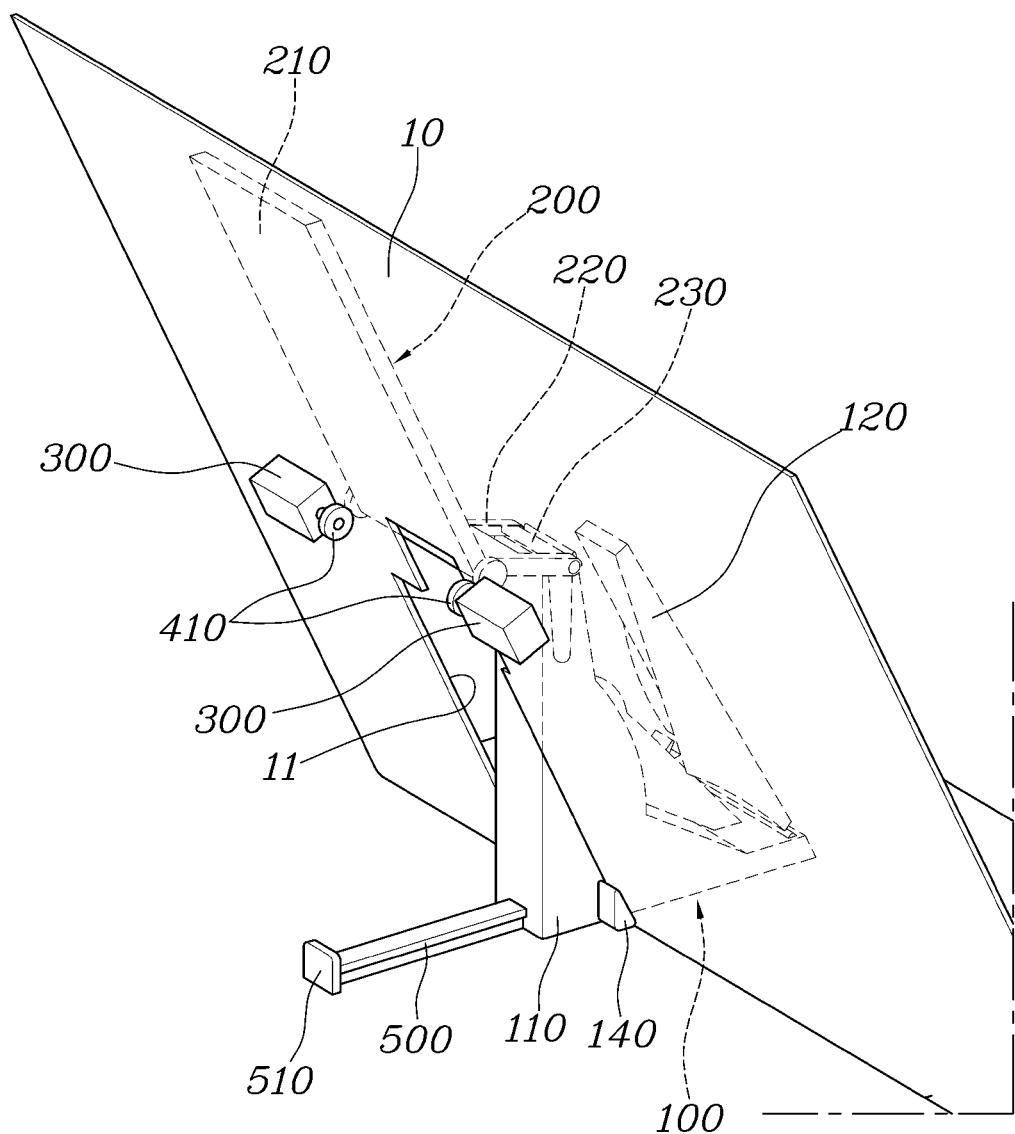
FIG. 10 is a view of FIG. 9 viewed from the front.
Figure 11:
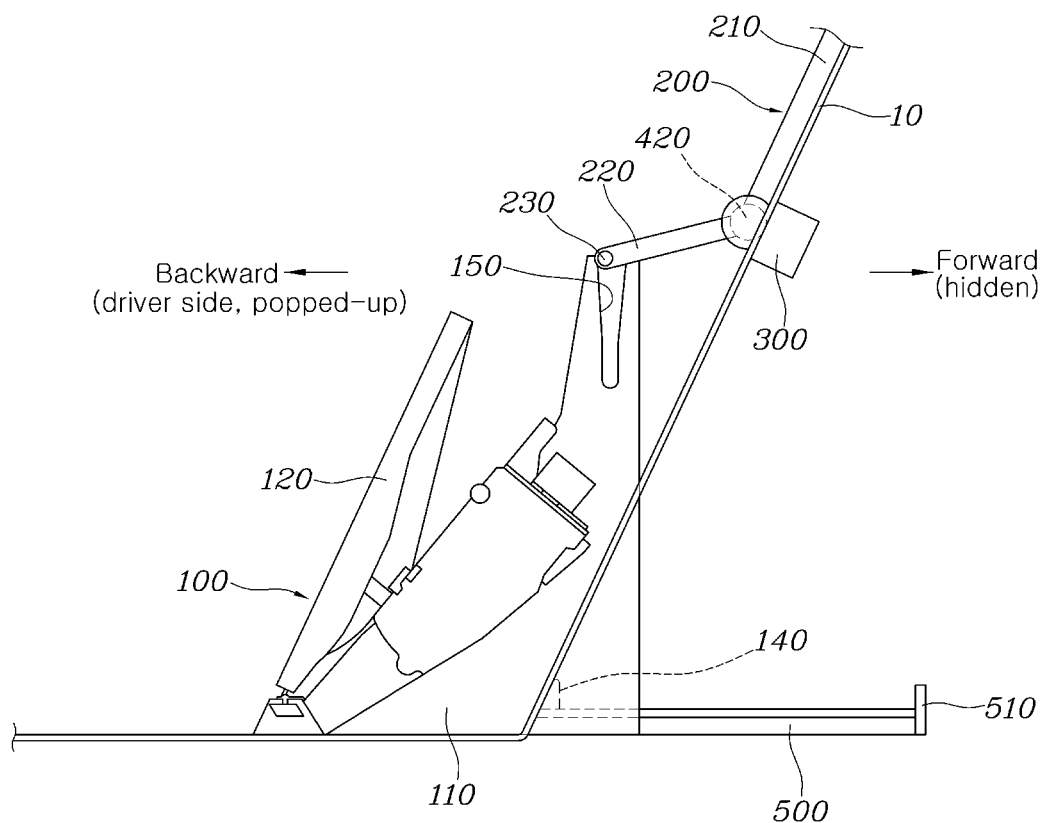
FIG. 11 is a side view of FIG. 9.

As shown in FIGS. 9 to 11, when the pedal module 100 is in the popped-up state, the driver may manipulate the pedal pad 120 by stepping on the same. When being manipulated by the driver, the pedal pad 120 is manipulated by the forward/backward rotation of the upper end portion thereof about the hinge point of the lower end portion thereof. When the pedal pad 120 is manipulated, a signal related to the pedal function is generated. The signal related to the pedal function is a signal related to braking or a signal related to acceleration.

When the driver manipulates the pedal pad 120 by stepping on the pedal pad 120 while the pedal module 100 is popped up, the pedal module 100 may be pushed forward thereof. The present disclosure has a configuration in which the support force of the moving lever 220 and the moving lever pin 230 inserted into the slot guide 150 may prevent the pedal module 100 from being pushed forward the pedal module 100, whereby the driver is capable of manipulating the pedal pad 120 in a more stable state.

The motor 300 according to an exemplary embodiment of the present disclosure is fixed on the footrest panel 10, and is a bidirectional motor configured for rotating in both clockwise and counterclockwise directions. At least two motors 300 may be provided to implement a fail-safe, and when one motor malfunctions, the rotation module 200 may be rotated by the other motor that functions properly.

The power transmission device 400 connecting the motors 300 to the rotation module 200 includes: a motor gear 410 coupled to each of the motors 300; a rotation gear 420 that rotates in mesh with the motor gear 410; and a rotation pin 430 which is integrated with the rotation gear 420 and the rotation module 200 while extending through the center portion of the rotation gear 420 and the rotation module 200 and is rotatably provided on the footrest panel 10.

The rotation pin 430 horizontally extends through the upper end portion of the rotation cover 210 to which the moving lever 220 is connected. Both end portions of the rotation pin 430 extending through the rotation cover 210 penetrate the centers of the rotation gears 420, respectively. The rotation pin 430, the rotation cover 210, and the rotation gear 420 are integrated and rotate at the same time.

Two motor gears 410 and two rotation gears 420 are also provided to be coupled to the two motors 300.

Figure 12:
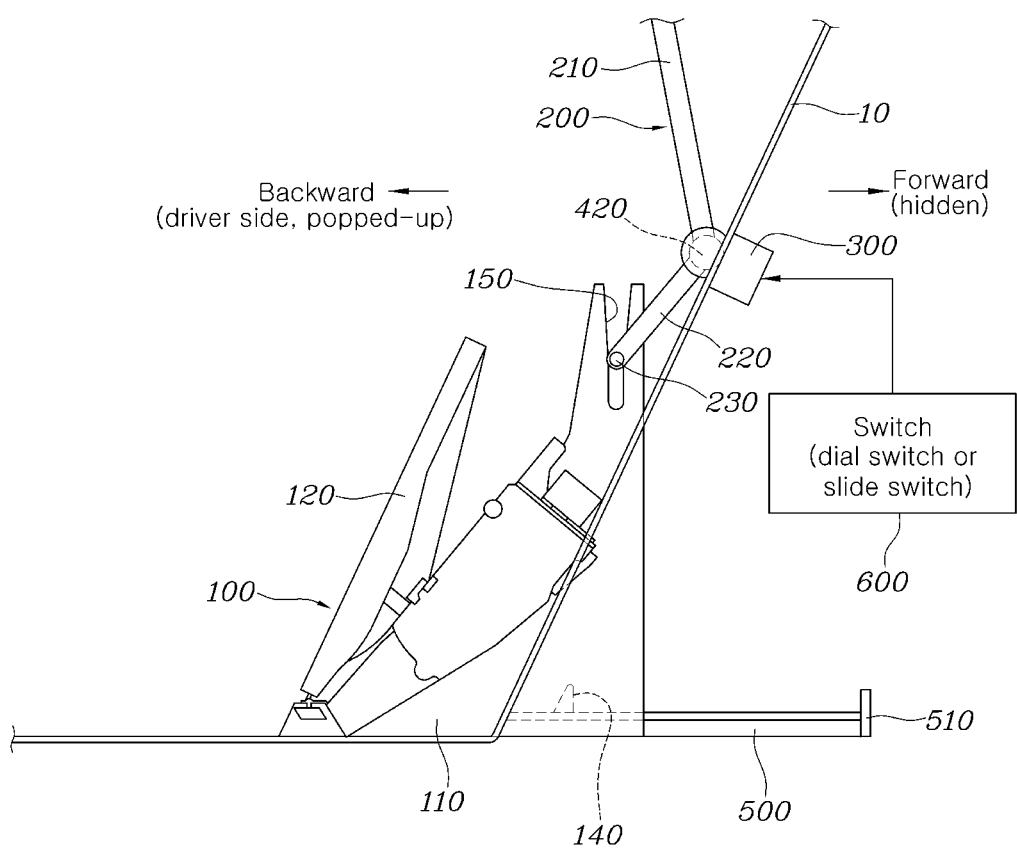
FIG. 12 illustrates a state in which a pedal module is popped up by operation of a dial switch or a slide switch according to an exemplary embodiment of the present disclosure.

As illustrated in FIG. 12, the motor 300 may be manipulated by manipulating a switch 600 provided in the vehicle. The switch 600 includes a dial switch or a slide switch. The user can adjust the popped-up position of the pedal module 100 to a target position by controlling the driving of the motor 300 by rotating the dial switch or sliding the slide switch, and thus user convenience may be improved.

According to an exemplary embodiment of the present disclosure, two pedal modules 100 including the same configuration are provided left and right while being spaced from the footrest panel 10. One of the two pedal modules 100 including the same configuration is used as a brake pedal, and the other is used as an accelerator pedal. Typically, the pedal module used as a brake pedal may be positioned on the left side of the footrest panel 10, and the pedal module used as an accelerator pedal may be positioned on the right side thereof.

As described above, the foldable pedal apparatus according to an exemplary embodiment of the present disclosure is advantageous in that, in a manual driving mode in which a driver drives manually, the pedal module 100 may protrude and be exposed (popped up) toward the driver to be manipulated by the driver, and in a self-driving mode, the pedal module 100 may be hidden and prevented from being exposed toward the driver so as not to be manipulated by the driver. Therefore, the foldable pedal apparatus enables the driver to have a comfortable rest in the self-driving mode, and furthermore, may improve safety by preventing erroneous manipulation of pedals in the self-driving mode.

Furthermore, the foldable pedal apparatus according to an exemplary embodiment of the present disclosure is configured to implement the foldable function of pedals by moving the pedal module 100 forwards and backward by the rotation of the power transmission device 400 and the rotation module 200 by operation of the motor 300. Therefore, the number of components may be minimized by simplifying the mechanism of a foldable function as much as possible, reducing the cost, reducing the weight, and minimizing the layout.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
   a pedal module provided to be movable forwards and backwards through a footrest panel; and
   a rotation module rotatably coupled to the footrest panel and brought into contact with the pedal module during rotation thereof to move the pedal module forwards and backwards through the footrest panel,
   wherein a guide protrusion is disposed to extend forwards and backwards on a bottom surface in front of the footrest panel,
   wherein a guide groove, into which the guide protrusion is inserted, is formed to extend forwards and backwards in a bottom surface of the pedal module,
   wherein a folding stopper is provided at a front end portion of the guide protrusion, and
   wherein when the pedal module is moved forward and brought into contact with the folding stopper, a position of the pedal module is fixed in a hidden state.

2. The foldable pedal apparatus of claim 1, further including:
   a motor fixed on the footrest panel; and
   a power transmission device connecting the motor to the rotation module to transmit power of the motor to the rotation module.

3. The foldable pedal apparatus of claim 2, wherein the motor is a bidirectional rotation motor configured for rotating in a clockwise direction and in a counterclockwise direction, and at least two motors are disposed.

4. The foldable pedal apparatus of claim 2, wherein the power transmission device includes:
   a motor gear coupled to the motor;
   a rotation gear rotating in mesh with the motor gear; and
   a rotation pin, which extends through a center portion of the rotation gear and the rotation module to be integrated with the rotation gear and the rotation module and is rotatably provided on the footrest panel.

5. The foldable pedal apparatus of claim 2,
   wherein the motor is operable by manipulating a switch provided in the vehicle,
   wherein the switch includes a dial switch or a slide switch, and
   wherein a popped-up position of the pedal module is adjusted to a target position by controlling driving of the motor in response to rotation of the dial switch or sliding the slide switch.

6. The foldable pedal apparatus of claim 1, wherein when the pedal module is moved forward by rotation of the rotation module and is hidden in the footrest panel, the pedal module is in the hidden state in which a driver is not capable of manipulating the pedal module in a self-driving mode of the vehicle.

7. The foldable pedal apparatus of claim 1, wherein when the pedal module is moved backward by rotation of the rotation module and protrudes from the footrest panel, the pedal module is in a popped-up state in which a driver is capable of manipulating the pedal module in a manual driving mode of the vehicle.

8. The foldable pedal apparatus of claim 1, wherein the pedal module includes:
   a pedal housing provided to move forwards and backwards through a panel hole formed in the footrest panel; and
   a pedal pad including a lower end portion rotatably hinged to the pedal housing and an upper end portion rotatable forwards and backwards about a hinge point of the lower end portion.

9. The foldable pedal apparatus of claim 1,
   wherein a pop-up stopper is disposed to protrude laterally from a side surface of the pedal module, wherein when the pedal module moves backward, the pop-up stopper is brought into contact with the footrest panel, and wherein when the pop-up stopper is brought into contact with the footrest panel, the position of the pedal module is fixed in a popped-up state.

10. The foldable pedal apparatus of claim 1, wherein the rotation module includes:

a rotation cover configured to open or close a panel hole of the footrest panel during rotation thereof;

a moving lever connected to an upper end portion of the rotation cover at a predetermined angle and rotating integrally with the rotation cover; and a moving lever pin provided in the moving lever and configured to be brought into contact with the pedal module during rotation of the moving lever to move the pedal module.

11. The foldable pedal apparatus of claim 10, wherein a slot guide, which vertically extends and is open upward, is formed at a front upper portion of the pedal module, and wherein when the rotation module rotates, the moving lever pin is inserted into the slot guide to be brought into contact with the pedal module.

12. The foldable pedal apparatus of claim 11, wherein the rotation cover and the moving lever are formed with an obtuse angle, and wherein when the rotation cover closes the panel hole, the moving lever is positioned in front of the footrest panel, and the moving lever pin is separated from the slot guide.

13. The foldable pedal apparatus of claim 12, wherein the moving lever pin separated from the slot guide is positioned above the slot guide, wherein when the rotation cover closing the panel hole rotates in a direction in which the panel hole is opened, the moving lever pin is inserted into the slot guide by downward rotation of the moving lever to be brought into contact with the pedal module, and wherein when the rotation cover rotates for an opening operation, the moving lever pin applies force to the pedal module so that the pedal module is moved backward and popped up.

14. The foldable pedal apparatus of claim 13, wherein when the popping-up of the pedal module is completed, the rotation cover is brought into contact with the footrest panel above the panel hole and fixedly positioned, and the moving lever pin remains inserted into the slot guide to fix a position of the popped-up pedal module.

15. The foldable pedal apparatus of claim 14, wherein a support force of the moving lever and the moving lever pin inserted into the slot guide prevents the pedal module from being pushed forward when a driver manipulates the pedal module while the pedal module is popped up.

16. The foldable pedal apparatus of claim 11, wherein the slot guide is formed to have a gap increasing toward an upper end portion thereof which is open for insertion and separation of the moving lever pin when the moving lever rotates.

17. The foldable pedal apparatus of claim 10, wherein when the rotation cover closes the panel hole, the pedal module moves forward to maintain the hidden state in which the pedal module is hidden in the footrest panel.

18. The foldable pedal apparatus of claim 1, wherein two pedal modules including an identical configuration are provided left and right while being spaced from the footrest panel, a first one of the two pedal modules is used as a brake pedal, and a second one is used as an accelerator pedal.

19. A foldable pedal apparatus for a vehicle, the foldable pedal apparatus comprising:

a pedal module provided to be movable forwards and backwards through a footrest panel; and a rotation module rotatably coupled to the footrest panel and brought into contact with the pedal module during rotation thereof to move the pedal module forwards and backwards through the footrest panel, wherein the rotation module includes:

a rotation cover configured to open or close a panel hole of the footrest panel during rotation thereof;

a moving lever connected to an upper end portion of the rotation cover at a predetermined angle and rotating integrally with the rotation cover; and a moving lever pin provided in the moving lever and configured to be brought into contact with the pedal module during rotation of the moving lever to move the pedal module, wherein a slot guide, which vertically extends and is open upward, is formed at a front upper portion of the pedal module, and wherein when the rotation module rotates, the moving lever pin is inserted into the slot guide to be brought into contact with the pedal module.

* * * * *